United States Patent Office 3,129,320
Patented Apr. 14, 1964

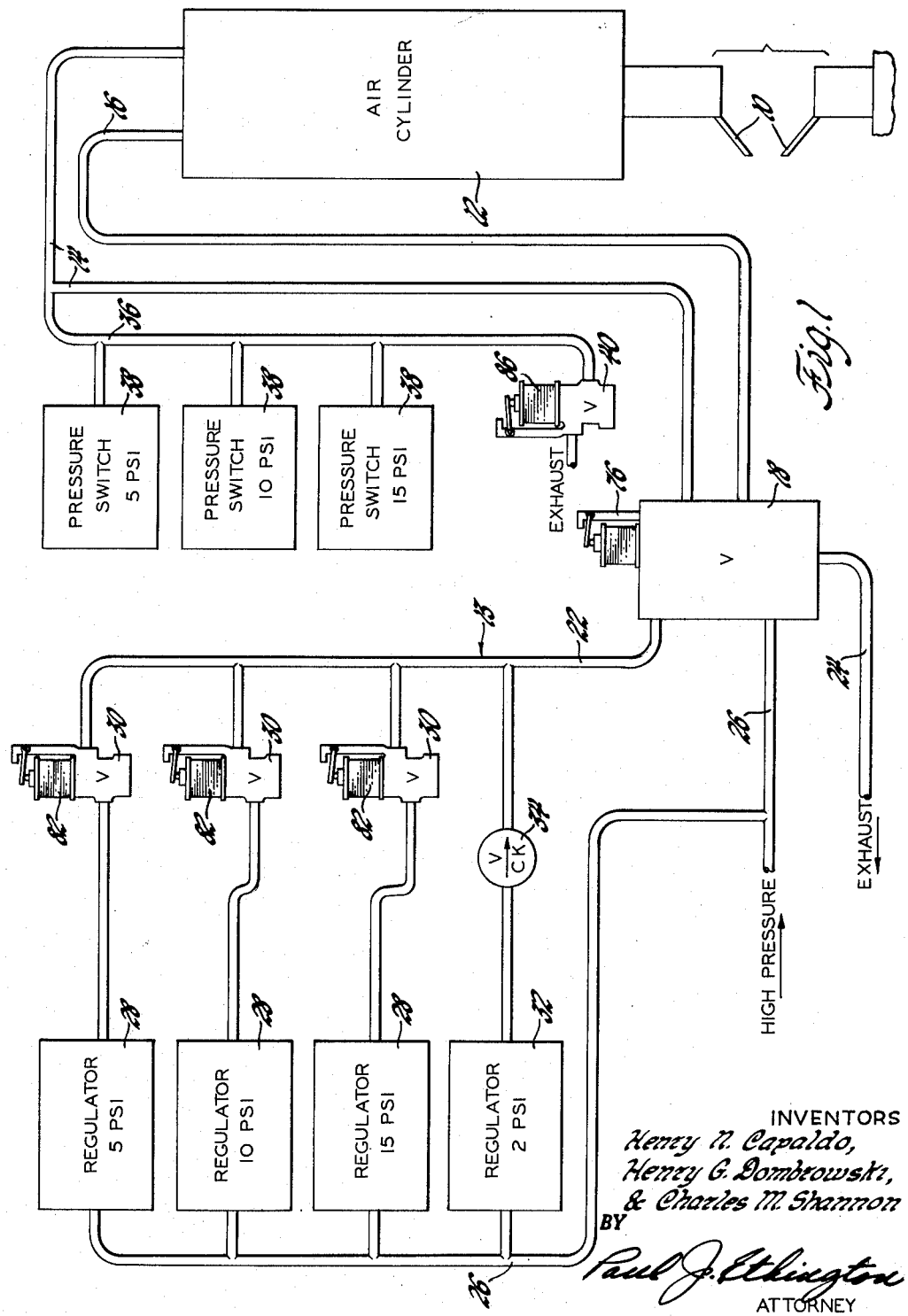

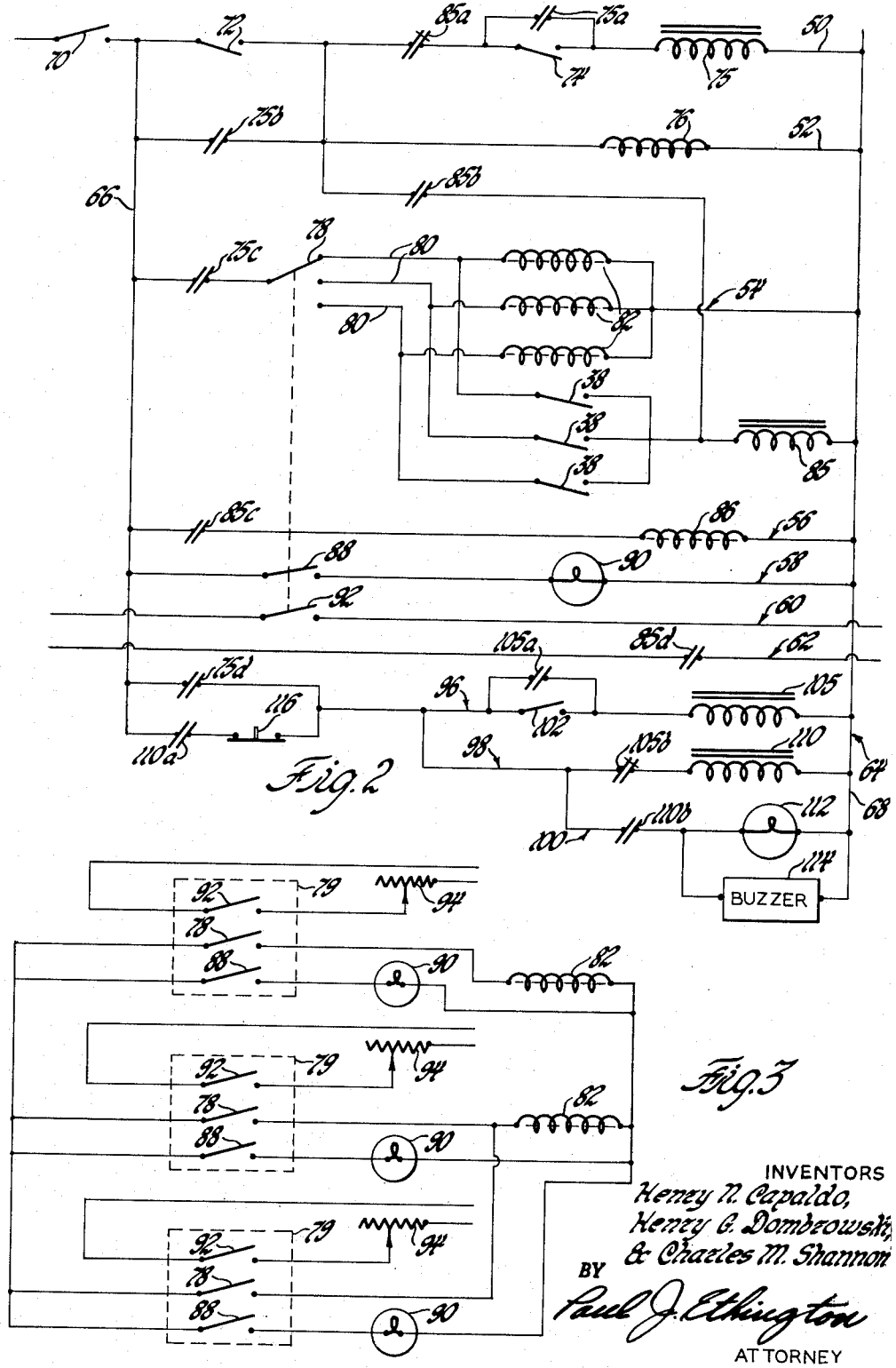

3,129,320
WELDING CONTROL
Henry N. Capaldo, Greendale, Henry G. Dombrowski, Hales Corners, and Charles M. Shannon, Milwaukee, Wis., assignors to General Motors Corporation, Detroit, Mich., a corporation of Delaware
Filed Apr. 13, 1961, Ser. No. 102,767
11 Claims. (Cl. 219—89)

This invention relates to a welding control and more particularly to a welding control requiring only a single manual operation to select the welding parameters.

Previous welding controls have required at least two manual settings to be used by the operator to select the welding parameters. Typically, one control regulates the electrode pressure while the other control regulates the welding heat by varying the amount or the time of current flow. In performing a series of welds on an electronic device, where various types of leads are welded together in many different combinations, different parameters may be required for each weld. It may require several days to train an operator to make the correct selections of the proper parameters and to learn which combinations of parameters are to be used for each weld. Even when the operator becomes experienced at welding a particular device much time will be wasted by the frequent setting of two or more controls.

An object of this invention is to eliminate the difficulty of training an operator and to save time in performing a series of welds by providing a welding control which requires only a single manual operation to select the proper set of conditions for each weld.

This invention is carried out by providing a series of push button switches or other control mechanisms wherein each control mechanism is connected to a predetermined set of welding parameters so that both the electrode pressure and weld heat may be selected by operation of one of the mechanisms.

Each of several pushbuttons actuates several switches, one of the switches being connected with a pressure control system to make available a predetermined pressure while another switch operates upon a current control circuit to make available a predetermined current. A foot switch is depressed to lower the electrode and further depressed to start current flow. A control circuit automatically completes the operation and a signal system indicates a failure of current flow.

Other advantages of the invention will be made more apparent from the following specification taken in conjunction with the accompanying drawings wherein like numerals refer to like elements and wherein FIGURE 1 is a schematic diagram of the pneumatic control system of the invention, FIGURE 2 is a schematic diagram of the electrical circuit according to the invention, and FIGURE 3 is a schematic diagram of the push button circuit arrangement according to the invention.

Referring to FIGURE 1, a pair of welding electrodes 10 are positioned one above the other in conventional manner so that the upper electrode is movable by an air operated piston, not shown, disposed within the air cylinder 12. The air cylinder is connected to an air pressure regulation system 13 by a "piston down" line 14 and by a "piston up" line 16. Both of said lines are controlled by the solenoid operated main valve 18 which, when moved to piston down position, will connect a low pressure supply line 22 to the "piston down" line 14 while the "piston up" line 16 will be connected to exhaust 24. When the main valve 18 is moved to its normal "piston up" position, a high pressure input line 26 will be connected to the "piston up" line 16 while the "piston down" line 14 is connected to exhaust 24. The regulation system 13 is supplied by high pressure from the input line 26 which is modified by one of a series of pressure regulators 28, each of which is in series with a solenoid operated valve 30. The regulators 28 are set for, say, 5, 10, and 15 p.s.i. A two p.s.i. regulator 32 is connected to the low pressure line 22 through a check valve 34 so that the low pressure line will always have at least two p.s.i. of pressure. If, however, one of the solenoid operated valves 30 is opened, then the low pressure line 22 will be subjected to 5, 10, or 15 p.s.i. The "piston up" line 16 leading to the air cylinder 12 has a branch line 36 to which is connected three pressure switches 38 responsive to 5, 10, and 15 p.s.i., respectively. This branch line 36 is connectable to exhaust by a solenoid operated valve 40. The five solenoid operated valves mentioned above are operated by suitable control circuitry now to be described.

It may be seen in FIGURE 2 that the control circuitry includes a holding circuit 50, a lower electrode circuit 52, a pressure selector circuit 54, an electrode release circuit 56, an indicator circuit 58, a current selector circuit 60, a current control circuit 62, and a signal system 64, all of which, except the current control and current selector circuits 62, 60, are connected between a common supply line 66 and ground 68. The common supply line 66 is energized by a standard 110 volt A.C. source and is connected thereto through a power switch 70.

The holding circuit 50 contains a pair of foot operated switches 72, 74 corresponding to the first and second foot switch positions respectively, and a normally closed relay switch 85a, which may be termed the release switch, is interposed between the two foot switches 72, 74. The first relay coil 75 is in series with these three switches 72, 74, 85a, and operates a set of normally open holding contacts 75a in parallel with the second foot switch 74 and a similar set of contacts 75b in parallel with the first foot switch 72.

The lower electrode circuit 52 is connected between ground 68 and the point intermediate the first foot switch 72 and the release switch 85a. The circuit contains only the solenoid 76 which operates the main valve 18.

The pressure selector circuit 54 contains a normally open relay switch 75c in series with a pressure selector switch 78 which is in contact with one of three circuits 80. The switch 78 represents a plurality of switches each operated by an individual pushbutton 79 (FIG. 3) and each adapted to close only one of the circuits 80. Each circuit 80 contains a solenoid 82 for operating one of the valves 30 of the pressure regulation system 13. Connected in parallel with the solenoids 82 are the three pressure switches 38 and a second relay coil 85. A line from the first foot switch 72 to the second relay coil 85 contains a set of normally open holding contacts 85a for the second relay 85 and operable thereby. The second relay 85 has a series of contacts 85a, 85b, etc., some of which are operated immediately upon energization of the relay coil 85 and some of which are operated only after a time delay. The release switch 85a is one of the latter.

The electrode release circuit 56 comprises normally open time delay contacts 85c in series with the solenoid 86 which operates the exhaust valve 40 on the branch line 36.

The indicator system comprises a series of circuits associated with each control button, each circuit containing a separate lamp to identify the button which is pushed and a switch operated by the button to energize the lamp. These circuits are represented in the drawing by the single circuit 58 containing the switch 88 and the lamp 90.

The current selector circuit 60 is represented schematically by a switch 92 connected mechanically with the pressure selector switch 78 and the push button indicator switch 88 which controls a circuit external of the control circuit. It is to be understood that the circuit shown represents a series of current selector circuits, each of which is associated with a potentiometer 94 (FIG. 3) which determines the amount of welding current flow. Each potentiometer 94 is adjusted to a predetermined setting so that each current selector switch 92 when depressed will cause the appropriate welding current to be selected. A separate current control circuit 62 containing normally open relay contacts 85d will initiate and terminate the current flow.

The signal system 64 comprises a pair of normally open relay switches 75d and 110a in parallel. In series with these switches is a group of parallel circuits 96, 98, 100. The first circuit 96 of the group contains a magnetic switch 102 in series with a relay coil 105 and the relay 105 in turn has a holding contact 105a in parallel with the magnetic switch 102. The magnetic switch 102 is used to detect the flow of welding current and is located so that due to the magnetic field set up by the current it will close when the welding current flows. The second circuit 98 of the parallel group includes a time delay relay 110 in series with a normally closed relay switch 105b. The third circuit of the parallel group includes a set of normally open contacts 110b associated with the time delay relay 110 and has connected therewith a lamp 112 and buzzer 114.

In operation a workpiece is manually inserted between the electrodes 10 and one of the push buttons is depressed. When the foot pedal is lowered to close the first foot switch 72, current will flow through the solenoid 76 which controls the main valve 18, thereby connecting the air cylinder 12 to the two p.s.i. air pressure source and causing the movable electrode to come down to engage the workpiece. When the foot pedal is further depressed to close the second foot switch 74, then the first relay 75 will be energized and both of the holding contacts 75a, 75b in parallel with the foot switches 72, 74 will be closed so that the foot switch may, if desired, be released and the welding operation will be continued automatically. The energization of the first relay 75 also closes the relay contacts 75c in the pressure selective circuit so that one of the solenoids 82 will be energized depending upon which push button has been depressed. The solenoid 82 will open its respective valve 30, thereby permitting 5, 10, or 15 p.s.i. of air pressure to flow into the air cylinder 12. When the desired air pressure has been built up in the cylinder the corresponding pressure switch 38 will be closed, thereby permitting energization of the second relay 85. The holding contacts of the second relay 85b will immediately be closed and also the contacts 85d in the current control circuit 62 will be closed so that welding current will flow. The amount of welding current which flows has been determined by depressing one of the push buttons. After the time delay period of relay 85 has expired the relay contacts 85c on the electrode release circuit 56 are closed, thereby energizing solenoid 86 to exhaust air from the branch line 36, and the normally closed release switch 85a is opened, thereby deenergizing the relay coil 75 which effectively deenergizes the entire control circuit. Thus the solenoid 76 will be released, returning the main valve 18 to its normal position, to connect the "piston down" pressure line 14 to exhaust 24 and connect the "piston up" pressure line 16 to the high pressure source 26.

In such an automatic apparatus it is desirable to have an indication of whether either the pressure or the current fails, thereby resulting in a bad weld or perhaps no weld. Since the second relay 85 is in series with a pressure switch no welding current can flow unless the selected pressure has been attained. If welding current does flow its corresponding magnetic field will cause the magnetic switch 102 in the signal system to close. Then, since the contacts 75d associated with the first relay 75 have already been closed, current will flow through the third relay 105 to close the holding contacts 105a across the magnetic switch 102 and to open the contacts 105b in series with the fourth relay 110. Hence the fourth relay will be deenergized and the contacts 110b in series with the lamp 112 and buzzer 114 will remain open. However, when the weld current fails to flow, the magnetic switch 102 will remain open, the third relay 105 will not be energized, and the fourth relay 110 will be energized and its contacts 110b will be closed after a time delay. The time delay of the fourth relay 110 is of a shorter period than that of the second relay 85 so that if the fourth relay 110 becomes energized the contacts 110b in the warning circuit will be closed to light the warning lamp 112 and operate the warning buzzer 114 before the control circuit is deenergized by the opening of the release switch 85a. In addition, the holding contacts 110a will also be closed so that the fourth relay 110 will remain energized and the warning system 68 will remain in operation even after the control circuit has become inoperative. This obviously serves to make a positive impression on the welding operator so that the condition of failure of current is forcibly brought to the operator's mind. In order to turn off the warning system once it has been set off, it is necessary merely to depress a reset button 116 which opens a switch in series with the holding contact 110a.

FIGURE 3 illustrates the preferred form of circuitry involving the push buttons 79 and depicts three push buttons 79, although a much larger number is contemplated. In one typical system, it has been found that 3 available pressures combined with 9 different welding currents was desirable. Then each of 9 buttons 79 would in advance be wired through a switch 78 to one of the 3 pressure solenoids 82 and each would be connected through switch 92 to a separate current control circuit containing potentiometers 94 which are preset to suitable resistances to provide the desired current. In addition, each push button 79 is connected through switch 88 with a lamp 90 which will indicate that the button has been depressed. Hence, each push button 79 when depressed will close three switches, 78, 88, 92, selecting the current, the pressure, and the indicator lamp. Of course, other switches may be added, for example, when it is expedient to have more than one switch in the potentiometer circuit. Usually it is preferred to have a separate welding current associated with each switch. However, if desired, the push button circuits may be interconnected so that two or three different buttons would select the same current yet select different pressures. Usually, even though separate currents are used for each push button, it is unnecessary to have such a large variety of pressures and 2 or 3 buttons may be connected to each pressure selector solenoid as indicated in FIG. 3. Thus it may readily be seen that the invention provides a system which is very simple to operate since for each weld it requires the selection of only one button and the subsequent operation of the foot switch.

Welding controls of this type are found to be useful for very high reliability products such as electronic modules for use in missile guidance systems or for other equipment of very exacting nature. For these purposes, it is very important to have not only the control system which, due to simplicity of operation, helps eliminate errors in selection of welding parameters, but also a signal system which indicates failure of the welding current or electrode pressure, thus enabling a detection of latent defects which may not be found by subsequent testing.

Of course, the details may be varied somewhat from the preferred embodiment disclosed herein and yet remain within the spirit of the invention. The scope of this invention is limited not by the embodiment disclosed, but only by the following claims.

We claim:
1. A welding control comprising an electrode pressure control system, a welding current control system, means for selecting the desired combination of pressure and current by a single manual operation and a signal means responsive to current and pressure for indicating when the selected current and pressure have failed.
2. A welding control as described in claim 1 wherein said signal means includes a switch responsive to electrode pressure, a switch responsive to current, and means responsive to the failure of response of either of said switches to energize a warning device.
3. A welding control as described in claim 1 wherein said signal means includes means to energize a warning device and current responsive means to prevent the operation of said warning device.
4. A welding control comprising an electrode pressure means, a series of solenoid operated means each for supplying a different given pressure thereto during the flow of welding current, push-button means for manually selecting one of said solenoids corresponding to the desired pressure, and control circuitry for energizing the selected solenoid.
5. A welding control comprising an electrode pressure means, a series of solenoid operated means each for supplying a given pressure thereto, a series of current supply circuits each for supplying a given welding current, push button means for manually selecting one of said solenoids corresponding to the desired pressure and simultaneously selecting one of said current supply circuits, and control circuitry for energizing the selected solenoid and welding current supply.
6. A welding control comprising a pneumatic electrode pressure means, a series of solenoid operated valve means each for supplying a different given pneumatic pressure thereto during the flow of welding current, push-button means for manually selecting one of said solenoid valve means corresponding to the desired pressure, and control circuitry for energizing the selected solenoid.
7. A welding control comprising a pneumatic electrode pressure means, a series of solenoid operated valve means each for supplying a given pneumatic pressure thereto, a series of current supply circuits each for supplying a given welding current, push-button means for manually selecting one of said solenoid operated valve means corresponding to the desired pressure and simultaneously selecting one of said current supply circuits, and control circuitry for energizing the selected solenoid and current supply.
8. A welding control as described in claim 7 having a pressure switch corresponding to each of said solenoid operated valve means, and means controlled by the pressure switch corresponding to said one solenoid operated valve means for initiating said welding current.
9. A welding control comprising a pneumatic electrode pressure means, a series of solenoid operated valve means each for supplying a given pneumatic pressure thereto, a series of current supply circuits each for supplying a given welding current, push-button means for manually selecting one of said solenoid valve means corresponding to the desired pressure and simultaneously selecting one of said current supply circuits, a pressure switch corresponding to said one solenoid valve means, means controlled by said pressure switch for initiating said welding current, a warning circuit to give a warning signal a predetermined time after said pressure switch is closed, and welding current responsive means for preventing said warning signal whereby said signal is given only upon failure of said current.
10. A welding control comprising an electrode pressure control system, a variable welding current control system, a plurality of manually operated switches, and relay circuitry associated with each of said switches for selecting the desired combination of pressure and current upon actuation of one of said switches.
11. A welding control comprising an electrode pressure control system, a variable welding current control system, a plurality of manually operated switches for selecting the desired combination of pressure and current by a single manual operation wherein each of said switches comprises contacts associated with said current control system and contacts associated with said pressure control system.

References Cited in the file of this patent
UNITED STATES PATENTS

| | | |
|---|---|---|
| 1,848,271 | Phelps | Mar. 8, 1932 |
| 1,902,955 | Holmes | Mar. 28, 1933 |
| 1,931,255 | Frantz | Oct. 17, 1933 |
| 2,224,733 | Konig et al. | Dec. 10, 1940 |
| 2,453,409 | Chace | Nov. 9, 1948 |

FOREIGN PATENTS

| | | |
|---|---|---|
| 283,630 | Great Britain | Jan. 11, 1928 |